United States Patent
Agrawal et al.

(10) Patent No.: US 10,025,783 B2
(45) Date of Patent: Jul. 17, 2018

(54) IDENTIFYING SIMILAR DOCUMENTS USING GRAPHS

(71) Applicant: Microsoft Technology Licensing, LLC, Redmond, WA (US)

(72) Inventors: Rakesh Agrawal, San Jose, CA (US); Sreenivas Gollapudi, Cupertino, CA (US); Anitha Kannan, Mountain View, CA (US); Krishnaram Kenthapadi, Sunnyvale, CA (US); Nathaniel Dion Parrish, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 14/610,261

(22) Filed: Jan. 30, 2015

(65) Prior Publication Data
US 2016/0224547 A1    Aug. 4, 2016

(51) Int. Cl.
*G06F 17/30* (2006.01)

(52) U.S. Cl.
CPC .... *G06F 17/30011* (2013.01); *G06F 17/3053* (2013.01); *G06F 17/30554* (2013.01); *G06F 17/30958* (2013.01)

(58) Field of Classification Search
CPC ........... G06F 17/3053; G06F 17/30011; G06F 17/30554; G06F 17/30958
USPC ........................................ 707/748, 758, 759
See application file for complete search history.

(56) References Cited

U.S. PATENT DOCUMENTS

| | | | | |
|---|---|---|---|---|
| 7,505,989 | B2* | 3/2009 | Gardner | G06F 17/30734 707/999.104 |
| 8,626,761 | B2* | 1/2014 | Kawai | G06F 17/30705 707/736 |
| 2005/0240583 | A1 | 10/2005 | Li et al. | |
| 2006/0106792 | A1* | 5/2006 | Patterson | G06F 17/30616 707/E17.084 |
| 2008/0147622 | A1* | 6/2008 | Koike | G06F 17/30265 707/E17.026 |
| 2010/0153369 | A1 | 6/2010 | Peoples et al. | |

(Continued)

OTHER PUBLICATIONS

Agrawal, et al., "Enriching textbooks with images", In Proceedings of the 20th ACM international conference on Information and knowledge management, Oct. 2011, 10 pages.

(Continued)

*Primary Examiner* — Phong H Nguyen
(74) *Attorney, Agent, or Firm* — Jonathan M. Waldman

(57) ABSTRACT

While a document, such as an e-book, is read by a user on a computing device such as an e-reader, concept phrases are extracted from the document. The extracted concept phrases may be words or phrases that match known concept phrases such as headings. Based on a universal concept phrase graph that includes nodes for each known concept phrase, core concept phrases are determined for the document. These core concept phrases are associated with nodes of the universal concept phrase graph that are located within a predetermined distance of nodes that represent the concept phrases extracted from the document. Each core concept phrase is combined with one or more of the concept phrases to generate multiple queries. These queries are submitted to search engines, and indicators of documents from the corresponding search results are presented to the user with the original document that is being read.

18 Claims, 6 Drawing Sheets

(56) References Cited

U.S. PATENT DOCUMENTS

| | | | | |
|---|---|---|---|---|
| 2010/0287179 | A1* | 11/2010 | Peoples | G06F 17/30663 707/769 |
| 2011/0004462 | A1* | 1/2011 | Houghton | G10L 15/183 704/9 |
| 2011/0184960 | A1 | 7/2011 | Delpha et al. | |
| 2011/0225159 | A1 | 9/2011 | Murray | |
| 2012/0303603 | A1* | 11/2012 | Kim | G06F 17/30056 707/706 |
| 2014/0046934 | A1* | 2/2014 | Zhou | G06F 17/30864 707/723 |
| 2014/0114977 | A1 | 4/2014 | Coifman et al. | |
| 2016/0012119 | A1* | 1/2016 | Franceschini | G06F 17/30864 707/722 |

OTHER PUBLICATIONS

Amini, et al., "Trajectory-Aware Mobile Search", In Proceedings of the SIGCHI Conference on Human Factors in Computing Systems, May 5, 2012, 4 pages.

Bai, et al., "Using query contexts in information retrieval", In Proceedings of the 30th Annual International ACM SIGIR conference on Research and Development in Information Retrieval, Jul. 23, 2007, 8 pages.

Bordino, et al., "Query similarity by projecting the query-flow graph", In Proceedings of the 33rd International ACM SIGIR Conference on Research and Development in Information Retrieval, Jul. 19, 2010, 8 pages.

Bruza, et al., "Aboutness from a commonsense perspective", In Journal of the American Society for Information Science, Oct. 2000, 21 pages.

Cao, et al., "Towards Context-Aware Search by Learning a Very Large Variable Length Hidden Markov Model from Search Logs", In Proceedings of the 18th international conference on World Wide Web, Apr. 20, 2009, 10 pages.

Dong, et al., "Asymmetric Distance Estimation with Sketches for Similarity Search in High-Dimensional Spaces", In Proceedings of the 31st annual international ACM SIGIR conference on Research and development in information retrieval, Jul. 2008, 8 pages.

Dong, et al., "Efficient K-Nearest Neighbour Graph Construction for Generic Similarity Measures", In Proceedings of the 20th international conference on World Wide Web, Mar. 28, 2011, 10 pages.

Eickhoff, et al., "Personalizing Atypical Web Search Sessions", In Proceedings of the sixth ACM international conference on Web search and data mining, Feb. 4, 2012, 10 pages.

Etzold, et al., "Context-aware querying for multimodal search engines", In Proceedings of the 18th international conference on Advances in Multimedia Modeling, Jan. 4, 2012, 12 pages.

Gabrilovich, et al., "Computing semantic relatedness using Wikipedia-based explicit semantic analysis", In Proceedings of the 20th international joint conference on Artifical intelligence, Jan. 6, 2007, 6 pages.

Gollapudi, et al., "An axiomatic approach for result diversification", In Proceedings of the 18th international conference on World Wide Web, Apr. 20, 2009, 10 pages.

Guan, et al., "Utilizing query change for session search", In Proceedings of the 36th international ACM SIGIR conference on Research and development in information retrieval, Jul. 28, 2013, 10 pages.

Hassan, Ahmed, "Identifying web search query reformulation using concept based matching", In Proceeding of Empirical Methods in Natural Language Processing, Oct. 2013, 11 pages.

Hidasi, et al., "Context-aware recommendations from implicit data via scalable tensor factorization", In Proceedings of CoRR, Sep. 2013, 26 pages.

Hjorland, Birger, "Towards a theory of aboutness, subject, topicality, theme, domain, field, content . . . and relevance", In Journal of the American Society for Information Science and Technology, vol. 52, Issue 9, May 24, 2001, 2 pages.

Hochbaum, Dorit S., "Approximation algorithms for the set covering and vertex cover problems", In SIAM Journal on Computing, Jan. 1982, 8 pages.

Hutchins, W. John, "On the problem of aboutness in document analysis", In Journal of Informatics, vol. 1, Apr. 1977, 16 pages.

Jiang, et al., "Context-aware search personalization with concept preference", In Proceedings of the 20th ACM international conference on Information and knowledge management, Oct. 24, 2011, 10 pages.

Jurafsky, et al., "Speech and language processing", In Book of Prentice Hall, 2nd edition, May 16, 2008, 5 pages.

Justeson, et al., "Technical terminology: Some linguistic properties and an algorithm for indentification in text", In Proceeding of Natural language engineering, Mar. 1995, 1 pages.

Manning, et al., "Introduction to information retrieval", In Cambridge University Press, Jul. 7, 2008, 4 pages.

Medelyan, et al., "Mining meaning from Wikipedia", In Journal International Journal of Human-Computer Studies, vol. 67, Issue 9, Sep. 2009, 76 pages.

Nettleton, et al., "Analysis of web search engine query session and clicked documents", In Proceedings of the 8th Knowledge discovery on the web international conference on Advances in web mining and web usage analysis, Aug. 20, 2006, 5 pages.

Paranjpe, Deepa, "Learning document aboutness from implicit user feedback and document structure", In Proceedings of the 18th ACM conference on Information and knowledge management, Nov. 2, 2009, 10 pages.

Roy, et al., "Location-aware type ahead search on spatial databases: Semantics and efficiency", In Proceedings of the ACM SIGMOD International Conference on Management of data, Jun. 12, 2011, 12 pages.

Sakai, Tetsuya, "On the Reliability of Information Retrieval Metrics based on Graded Relevance", In Information Processing and Management, vol. 43, Issue 2, Mar. 2007, 18 pages.

Schleif, R., "Genetics and Molecular Biology", Retrieved on: Aug. 26, 2014, 4 pages.

Strube, et al., "WikiRelate! Computing semantic relatedness using Wikipedia", In Proceedings of the 21st national conference on Artificial intelligence—vol. 2, Jul. 16, 2006, 6 pages.

Tan, et al., "Unsupervised query segmentation using generative language models and Wikipedia", In Proceedings of the 17th international conference on World Wide Web, Apr. 21, 2008, 10 pages.

Xiang, et al., "Context-aware ranking in web search", In Proceedings of the 33rd international ACM SIGIR conference on Research and development in information retrieval, Jul. 19, 2010, 8 pages.

Xue, et al., "Improving verbose queries using subset distribution", In Proceedings of the 19th ACM international conference on Information and knowledge management, Oct. 26, 2010, 10 pages.

Yan, et al., "Substructure similarity search in graph databases", In Proceedings of the ACM SIGMOD International Conference on Management of Data, Jun. 14, 2005, 12 pages.

Yang, et al., "Query by document", In Proceedings of the Second ACM International Conference on Web Search and Data Mining, Feb. 9, 2009, 10 pages.

Zeng, et al., "Comparing stars: On approximating graph edit distance", In Proceedings of the VLDB Endowment, vol. 2, Issue 1, Aug. 24, 2009, 12 pages.

Zhong, et al., "Location-aware instant search", In Proceedings of the 21st ACM international conference on Information and knowledge management, Oct. 29, 2012, 36 pages.

Agrawal, et al., "On Dimensionality Reduction of Massive Graphs for Indexing and Retrieval", In International Conference on Data Engineering, Apr. 11, 2011, 12 pages.

Chinpanthana, Nutchanun, "Semantic Similarity Measure with Conceptual Graph-Based Image Annotations", In International Conference on Advanced Computer Science Applications and Technologies, Nov. 28, 2012, 6 pages.

Dragoni, et al., "An Ontological Representation of Documents and Queries for Information Retrieval Systems", In Proceedings of the 1st Italian Information Retrieval Workshop, Jan. 27, 2010, 5 pages.

(56) References Cited

OTHER PUBLICATIONS

Agrawal, et al., "Mining videos from the web for electronic textbooks", In Technical Report—MSR-TR-2014-5, Jan. 2014, 11 pages.

Agrawal, et al., "Enriching textbooks through data mining", In ACM Symposium on Computing for Development (ACM DEV), Dec. 2010, 38 pages.

* cited by examiner

IDENTIFYING SIMILAR DOCUMENTS USING GRAPHS

BACKGROUND

The use of e-books and other electronic documents are rapidly increasing. E-books, as opposed to traditional books, can be easily updated after they have been sold. For example, a textbook manufacturer can push corrections or other updates to an electronic textbook to users, rather than forcing the users to purchase new versions of the textbook.

With e-books, additional information, such as video or audio content, can be incorporated into the e-book, or can be presented alongside the e-book to the user on whatever device that the user is using to read the e-book. However, identifying such relevant information may be difficult.

SUMMARY

While a document, such as an e-book, is read by a user on a computing device such as an e-reader, concept phrases are extracted from the document. The extracted concept phrases may be words or phrases that match known concept phrases such as headings from an online encyclopedia. Based on a universal concept phrase graph that includes nodes for each known concept phrase, one or more core concept phrases are determined for the document. The core concept phrases are associated with nodes of the universal concept phrase graph that are located within a predetermined distance of nodes that represent the concept phrases extracted from the document. Each core concept phrase is combined with one or more of the concept phrases to generate multiple queries. These queries are submitted to search engines, and indicators of one or more documents from the corresponding search results are presented to the user along with the original document that is being read.

In an implementation, a document is received by a computing device. A plurality of concept phrases associated with the document is determined by the computing device. A concept phrase graph of the received document is generated based on the determined plurality of concept phrases by the computing device. One or more documents of a plurality of documents that are similar to the received document are determined by the computing device based on the concept phrase graph of the received document, and concept phrase graphs associated with each of the documents of the plurality of documents.

In an implementation, a document is received by a computing device. A plurality of concept phrases associated with the received document is determined by the computing device. A plurality of core concept phrases associated with the received document is determined by the computing device. A plurality of queries is determined for the received document by the computing device. Each query includes a core concept phrase of the plurality of core concept phrases and at least one concept phrase of the plurality of concept phrases. For each query, indicators of documents that are responsive to the query are received by the computing device, and one or more of the received indicators of documents are provided by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
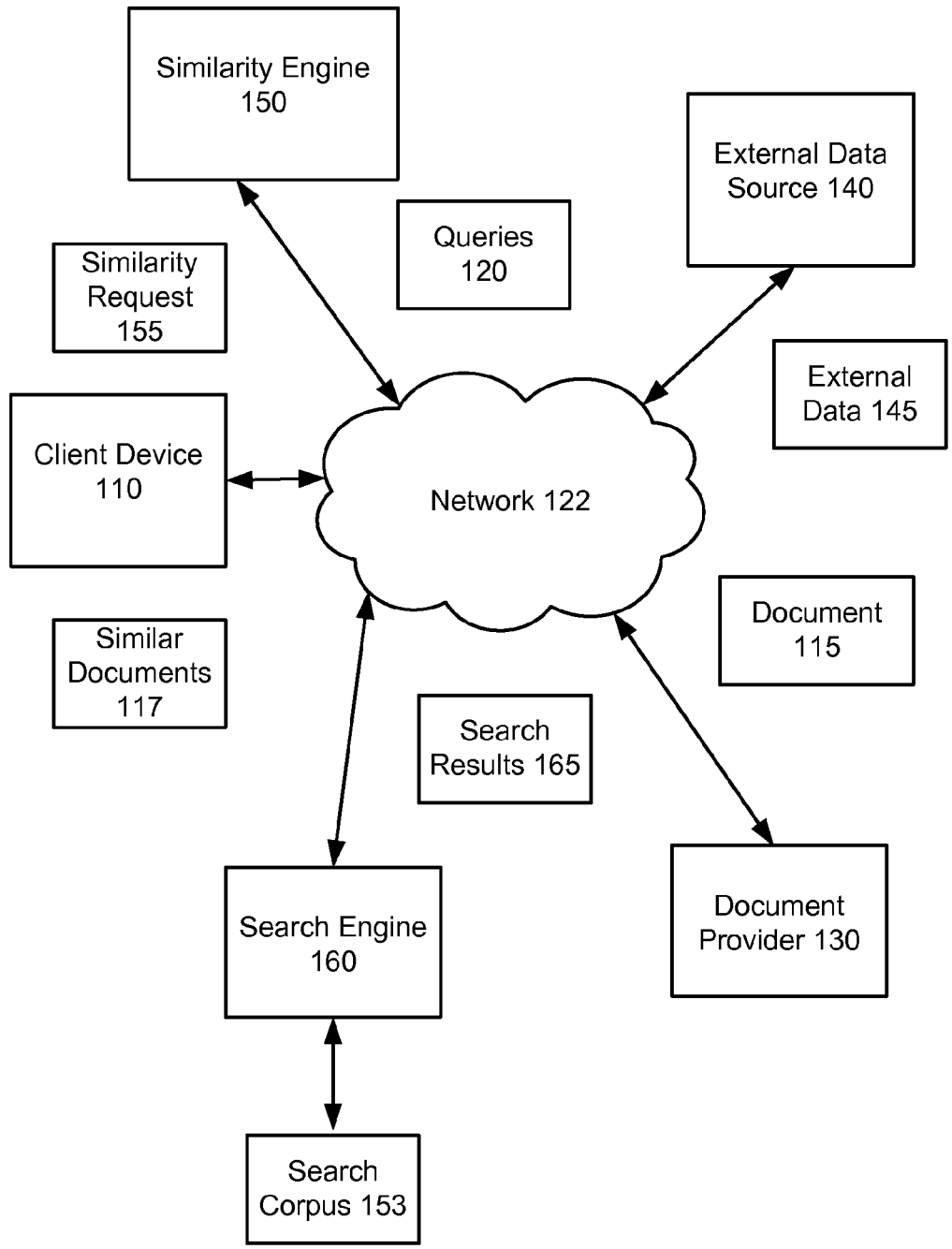
FIG. 1 is an illustration of an exemplary environment for presenting documents.

FIG. 1 is an illustration of an exemplary environment 100 for presenting documents. The environment 100 may include a client device 110, a similarity engine 150, an external data source 140, a document provider 130, and a search engine 160 in communication through a network 122. The network 122 may be a variety of network types including the public switched telephone network (PSTN), a cellular telephone network, and a packet switched network (e.g., the Internet). Although only one client device 110, similarity engine 150, external data source 140, document provider 130, and search engine 160 are shown in FIG. 1, there is no limit to the number of client devices 110, similarity engines 150, external data sources 140, document providers 130, and search engines 160 that may be supported.

The document provider 130 may provide and/or generate one or more documents 115. A document 115 may be a digital document or an electronic document and may include a variety of document types including, but not limited to books, textbooks, pamphlets, thesis papers, research papers, transcripts, dictionaries, webpages, blogs, journals, and encyclopedias, for example. Any type of document may be supported. As used herein, the term "document" may also include document portions such as paragraphs, chapters, sections, or pages of an e-book or other electronic document. The documents may be stored and distributed in a variety of formats including, but not limited to, PDF, HTML, XML, e-pub, etc. Other formats may be used.

In addition, the documents 115 may not be limited to text documents, but may also include video files, audio files, and image files. The documents 115 may further include metadata that describes the contents of the particular document such as the title, author, length, genre, and summary. The metadata may further include reviews or comments generated by users or viewers of the documents 115. Any type of data may be included in the metadata.

The search engine 160 may be configured to identify documents 115 in response to queries 120 received from users using devices such as the client device 110. In some implementations, the search engine 160 may receive a query 120 from a user and may fulfill the query 120 using data stored in a search corpus 153. The search corpus 153 may comprise an index of the documents 115 along with the text from the documents 115, keywords associated with the documents 115, and/or metadata associated with the documents 115.

The search engine 160 may fulfill a received query 120 by searching the search corpus 153 for documents 115 that are likely to be responsive the query 120. For example, the search engine 160 may match terms of the query 120 with the keywords, text, or metadata associated with the documents 115. Matching documents 115 may be identified as search results 165, for example.

The client device 110 may allow a user to view or read one or more documents 115. The client device 110 may be an e-reader or other computing device that is capable of rendering and displaying documents 115. The client devices 110 may include smart phones, tablet computers, video game players, and personal media players, for example. In addition, the client device 110 may be implemented as an application that is capable of rendering and displaying documents 115, or may be a plug-in, applet, or other software module that may allow another applications such as a web browser, to render and/or display documents 115. An example client device 110 is the computing device 600 described with respect to FIG. 6. For example.

Figure 2:
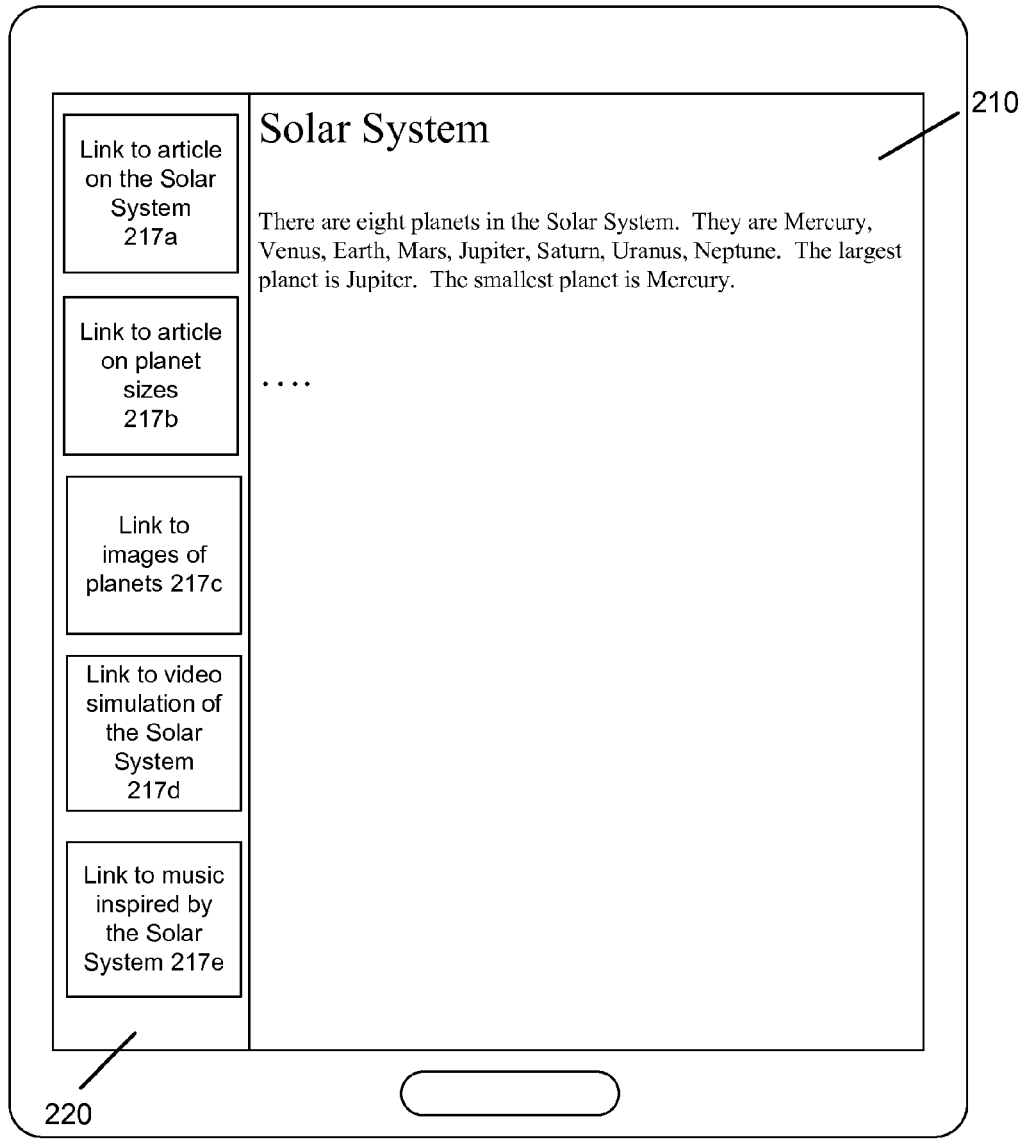
FIG. 2 is an illustration of an example implementation of a tablet computer.

One advantage associated with electronic documents is that when viewing a document 115, information regarding one or more relevant or related documents can be provided to the user while viewing the document 115. FIG. 2 shows an example of such an implementation. In FIG. 2 a user is reading a document 115 such as an e-book in a window 210 of a user interface of a tablet computer 200. As shown, the user is reading an e-book on the Solar System.

In a window 220 of the user interface, links 217a-217e are displayed to the user of the tablet computer 200. These links 217a-217e are to documents 115 that may have been determined to be relevant or similar to the document being read by the user in the window 210. As shown, the link 217a is a link to an article on the Solar System, the link 217b is a link to an article about the sizes of the planets, the link 217c is a link to images of the planets, the link 217d is a link to a video simulation of the Solar System, and the link 217e is a link to music inspired by the Solar System.

Alternatively, rather than links 217, portions of the documents 115 associated with the links 217 may be displayed in the window 220. For example, for the articles corresponding to the links 217a and 217b, a snippet or summary of the corresponding documents 115 may be displayed. For the images corresponding to the link 217c, a slideshow of the images may be displayed. For the video corresponding to the link 217d, a clip or portion of the video may be played.

In some implementations, the links 217 displayed to the user may be based on text or metadata associated with the entire document 115. Alternatively, the links displayed 217 displayed to the user may be based on the text from only a portion of the document 115, such as the current page or chapter being viewed. For example, the links 217a-217e may be based on the text of the particular page of the document 115 being viewed in the window 210. After the user "turns the page" using the tablet computer 200, a new set of links 217 may be displayed in the window 220 based on the new page displayed in the window 210.

Note that in the example shown, the information associated with the links 217 may be generated and displayed to the user in the window 220 without receiving any input or selection by the user of the tablet computer 200. This is in contrast to other systems where additional information may be retrieved and displayed to the user only after being requested by the user. For example, previously a user would select a word or phrase that is displayed in the window 210, and in response to the selection a definition of the word would be retrieved and displayed to the user in the window 220.

Displaying the additional information or documents 115 to the user without any action being required by the user is advantageous because users are often not aware that additional similar documents 115 may be available. Moreover, users may not understand the topic of the document 115 being viewed enough to be able to select an appropriate keyword or phrase from the document 115 to receive more information.

While presenting the similar or related documents to a user is useful and may enhance the user experience, determining the similar or related documents may be difficult. Accordingly, the environment 100 may further include a similarity engine 150 that identifies documents that are similar to a document being viewed at the client device 110, and provides the identified documents (or identifiers of the documents) as the similar documents 117. The similar documents 117 may be presented to the user as one or more of the links 217a-217e shown in the window 220 of FIG. 2, for example.

In one implementation, the similarity engine 150 may determine the similar documents 117 using what are referred to herein as concept phrase graphs. A concept phrase graph may be a graph that includes a node for each concept phrase, along with edges between the nodes that represent the relationships between the concept phrases associated with the nodes. For example, an edge between two nodes may indicate that associated concept phrases are related to each other, or are similar. Each concept phrase may be one or more words, phrases, or sentences.

Each document 115 may be associated with a concept phrase graph that is a sub-graph of a universal concept phrase graph. The universal concept phrase graph may include a node for all known concept phrases, along with edges between the nodes that represent the relationships between the concept phrases associated with the nodes. The concept phrase graph associated with a document 115 is a sub-graph of the universal concept phrase graph.

Depending on the implementation, the concept phrases and relationships that are used to form the universal concept phrase graph may be generated using external data 145 from one or more external data sources 140. The external data sources 140 may include dictionaries, encyclopedias, or listings of commonly used words or phrases. For example, the concept phrases used in the universal concept phrase graph may correspond to headings or titles taken from an online encyclopedia. The relationships used to form the edges of the concept phrase graph may be based on the underlying structure of the online encyclopedia.

For example, the relationships between two concept phrases may be based on the number of links in the online encyclopedia that are traversed to reach one concept phrase from the other within the encyclopedia, or how often the concept phrases appear together in the same article or page of the encyclopedia. Other methods for extracting concept phrases from external data sources 140 may be used.

The concept phrase graph for a document 115 may be determined by extracting words or phrases from the document 115 and comparing the extracted words or phrases to the concept phrases of the universal concept phrase graph. The matching words or phrases may be used as concept phrases in the concept phrase graph for the document 115. The edges from the universal concept phrase graph that correspond to the concept phrases of the document 115 may also be added to the concept phrase graph for the document 115.

Where the document 115 is not a text document (i.e., not an e-book or webpage), the similarity engine 150 may generate a concept phrase graph for the document 115 using the metadata associated with the document 115. As described above, the metadata may include the title of the document 115, one or more summaries of the document 115, reviews of the document 115, and one or more transcripts of the document 115. Other types of metadata may be used to generate the concept phrase graph.

The similarity of any two documents 115 may be determined by comparing the concept phrase graphs associated with each document 115. Any method or technique for determining the similarity of graphs may be used.

In some implementations, the similarity engine 150 may generate a concept phrase graph for each known document 115. When a client device 110 desires to display similar documents 117 to a document 115 being viewed by a user of the client device 110, the client device 110 may generate a similarity request 155 that identifies the document 115. The similarity engine 150 may then use the concept phrase graph associated with the document 115 to identify one or more similar documents 117. The similar documents 117 may then be presented to the user of the client device 110 in the window 220 as shown in FIG. 2.

Figure 3:
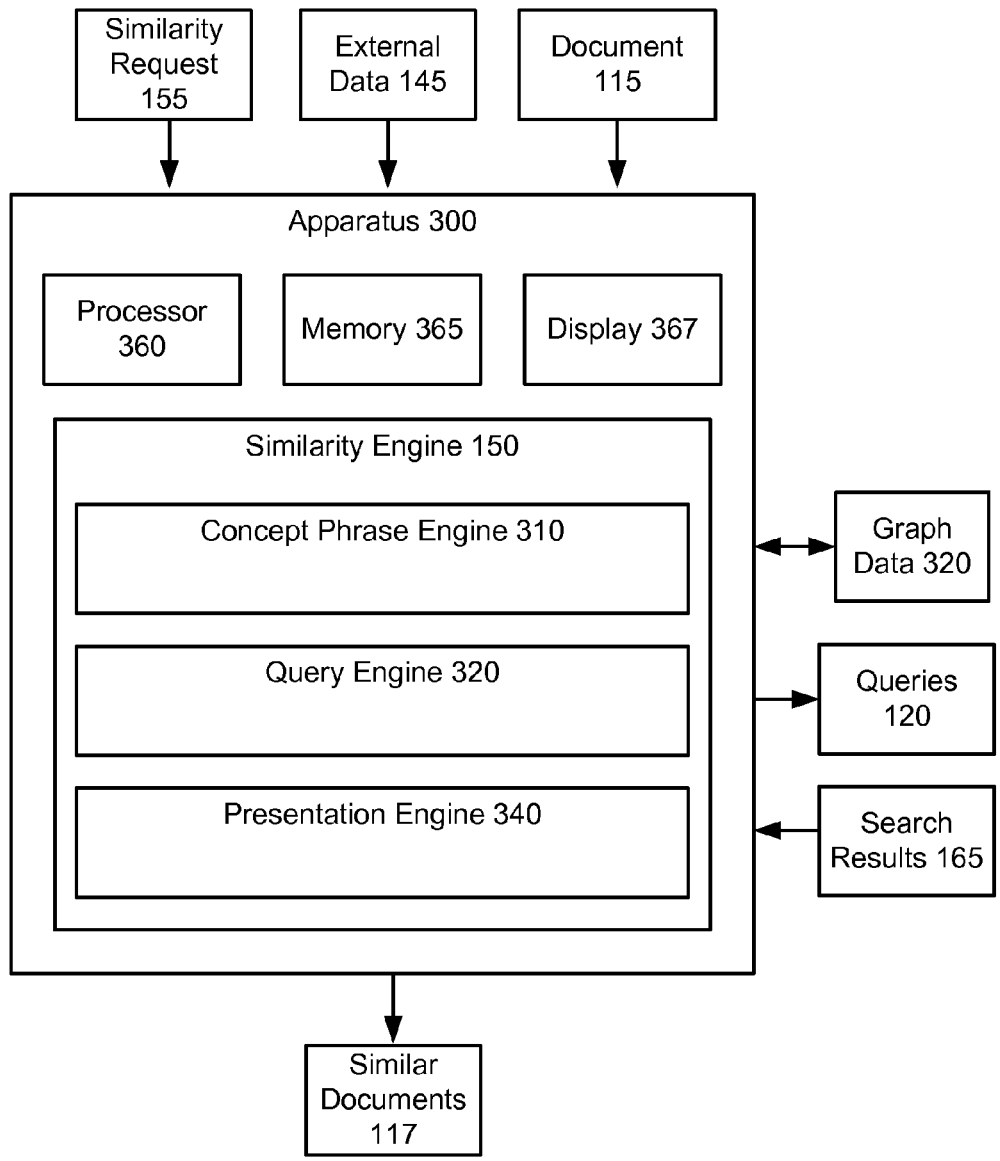
FIG. 3 is an illustration of an example apparatus.

As described further with respect to FIG. 3, in some implementations, the similarity engine 150 may further generate what is referred to herein as a "core concept phrase" graph for each document 115. A core concept phrase may be a concept phrase that captures or covers one or more of the concept phrases associated with the document 115. For example, the core concept phrase "celestial body" may cover both of the concept phrases "planet" and "stars." Depending on the implementation, the core concept phrases associated with a document 115 may be selected from the concept phrases already determined for the document 115. Alternatively, some or many of the core concept phrases may not be part of the concept phrases determined for a document 115, but may be determined using the universal concept phrase graph.

The similarity engine 150 may use one or both of the core concept phrase graph and the concept phrase graph to determine the similarity of two documents 115. The relative importance of each of the core concept phrase graph and the concept phrase graph with respect to the similarity determination may be specified by a user or an administrator, for example.

As may be appreciated, generating all of the core concept phrase graphs and concept phrase graphs by the similarity engine 150 may be computationally expensive. Accordingly, rather than generate the graphs for all of the documents 115, when a similarity request 155 is received by the similarity engine 150, the similarity engine 150 may generate one or both of the concept phrase graph and the core concept phrase graph for the document 115 identified in the similarity request 155. The generated graphs may then be used to generate one or more queries 120. Each generated query 120 may include a different combination of concept phrases and/or core concept phrases from the generated graphs.

The similarity engine 150 may then submit the generated queries 120 to one or more search engines 160, and in response may receive search results 165 for each of the submitted queries 120. One or more of the documents 115 identified in the various search results 165 may be presented as the similar documents 117. In addition, the similarity engine 150 may filter or rank the documents 115 identified in the various search results 165 to favor documents 115 that are identified in multiple sets of search results 165, or based on other factors such as weights associated with the queries 120 or positions of the documents 115 in the search results 165.

FIG. 3 is an illustration of an implementation of an exemplary apparatus 300. As shown, the apparatus 300 includes a processor 360, a memory 365, a display 367 and a similarity engine 150. The similarity engine 150 may include one or more components including a concept phrase engine 310, a query engine 320, and a presentation engine 340. More or fewer components may be included in the similarity engine 150.

Each of the concept phrase engine 310, query engine 320, and presentation engine 340 may be implemented by the processor 360 and/or the memory 365 of the apparatus 300. Example implementations of the apparatus 300 may include the computing device 600 described with respect to FIG. 6, the tablet computer 200 shown in FIG. 2, an e-reader, and a smart phone. Other types of computing devices may be used.

The concept phrase engine 310 may generate a universal concept phrase graph that includes some or all known concept phrases. As described previously, these concept phrases may be extracted from external data 145 received from one or more external data sources 140. The universal concept phrase graph may further include edges that represent the relationships and/or relatedness of the concept phrases. The universal concept phrase graph may be a weighted graph, or may be un-weighted. The concept phrase engine 310 may store the generated universal concept phrase graph in the graph data 320.

More formally, the set of all concept phrases determined from the external data 145 may be denoted by U. The universal concept phrase graph may be denoted by G=(U, E) where E is the set of all edges in G. Edges E in G may denote relationship between concept phrases, that is, there is an edge in E between nodes representing two concept phrases, if and only if the two concept phrases are related to each other.

The concept phrase engine 310 may generate a concept phrase graph for one or more documents 115 and may store the generated concept phrase graph for a document 115 as part of the graph data 320. The concept phrase graph for a document 115 $s$ may be denoted as C(s).

The concept phrase engine 310 may generate a concept phrase graph for a document 115 by first identifying some or all of the concept phrases in the document 115. In some implementations, the concept phrase engine 310 may identify the concept phrases by extracting words and phrases from the document 115 and comparing the extracted words and phrases to the words and phrases in the universal concept phrase graph (i.e., U). Those extracted words and phrases that match concept phrases from the universal concept phrase graph may be identified as the concept phrases for the document 115.

In some implementations, the concept phrase engine 310 may extract the words or phrases by identifying words or phrases that are significant k-grams. The concept phrase engine 310 may initially extract all significant unigrams, bigrams, and trigrams from the document 115. Other sized k-grams may also be considered.

Of the extracted k-grams, the concept phrase engine 310 may then prune the set of k-grams based on a frequency threshold. The frequency of a k-gram may be based on the number of times that it appears in the document 115. The frequency threshold may be set by a user or administrator, for example.

Of the remaining k-grams, the concept phrase engine 310 may calculate a significance score for each k-gram. The significance score for a k-gram may represent the likelihood that the words or terms of the k-gram appearing together based on their general usage in the English language. Those k-grams with a significance score below a threshold score may similarly be pruned from the set of k-grams.

The concept phrase engine 310 may then compare the remaining extracted k-grams with the concept phrases from the universal concept phrase graph as described above. Those k-grams that match a concept phrase from a node of the universal concept phrase graph may be associated with the document 115 as a concept phrase.

Where the document 115 includes metadata, the metadata may be also be considered by the concept phrase engine 310 when identifying the concept phrases associated with a document 115. For example, the k-grams may be extracted from the text of the various fields that make up the metadata.

The concept phrase engine 310 may then generate a concept phrase graph C(s) for a document 115 $s$ using the identified concept phrases. In some implementations, the concept phrase engine 310 may generate the concept phrase graph by taking a sub-graph of the universal concept phrase graph that includes all of the nodes from the universal concept phrase graph that are associated with concept phrases of the identified concept phrases. The sub-graph may also include all of the edges from the universal graph that correspond to the nodes of the sub-graph. The sub-graph may be associated with the document 115 $s$ as the C(s) and may be stored in the graph data 320.

The concept phrase graph engine 310 may further generate a core concept phrase graph for a document 115. The core concept phrase graph for a document 115 $s$ may be denoted as $\Gamma(s)$. A core concept phrase for a document 115 may be a concept phrase that is important to a document 115 and that captures one or more of the concept phrases associated with the document 115. The core concept phrases for a document 115 may be selected from the concept phrases of the universal concept phrase graph. The core concept phrases for a document 115 may not be limited to the concept phrases determined for the document 115.

A concept phrase may be said to cover all of the concept phrases that are reachable from that concept phrase in the universal concept phrase graph within a selected radius or distance. Distance may refer to the number of edges that comprise a path between two nodes. Thus, if the distance is two, then a concept phrase associated with a first node covers all concept phrases that are associated with nodes that are at reachable from the first node by following up to two edges. The concept phrase graph engine 310 may select the core concept phrases that cover the greatest number of concept phrases, while at the same time ensuring that most of the concept phrases are covered by the selected core concept phrases.

In some implementations, the concept phrase engine 310 may select the core concept phrases for $\Gamma(s)$ by first selecting the concept phrase from U that covers the greatest number of concept phrases from C(s) for a selected radius or distance. The selected radius may be specified by a user or administrator. For subsequent iterations, the concept phrase engine 310 may select the concept phrase from U that covers the greatest number of concept phrases from C(s) that are not already covered by a selected concept phrases. The concept phrase engine 310 may continue until the desired number of concept phrases for $\Gamma(s)$ have been selected. The core concept phrase graph may be generated from the selected concept phrases similarly as described above for the concept phrase graph.

Depending on the implementation, the concept phrase engine 310 may generate concept phrase graphs and core concept phrase graphs for each of the documents 115. Alternatively, the concept phrase engine 310 may generate a concept phrase graph and a core concept phrase graph for a document 115 identified by a similarity request 155.

The similarity engine 150 may receive a similarity request 155 and may identify one or more documents 115 that are similar to a document 115 that is identified in the similarity request 155. The similarity engine 150 may determine the similar documents, by for each document 115, determining a similarity score for the document 115 with respect to the document 115 identified in the similarity request 155. The documents 115 that have the greatest similarity scores may then be returned as the similar documents 117.

The similarity engine 150 may determine the similarity score between a document 115 $a$ and a document 115 $b$ using the concept phrase graphs and the core concept phrase graphs associated with the documents 115 $a$ and $b$ from the graph data 320. The similarity of the core concept phrase graphs and the concept phrase graphs may be determined using any one of a variety of methods and techniques for calculating the similarity of graphs.

The overall similarity score for the documents 115 $a$ and $b$ may be based on a combination of the similarity score generated using the concept phrase graphs and the similarity score generated using the core concept phrase graphs. Because the core concept phrase graphs are intended to capture the focus of the associated document 115, the similarity score for the core concept phrase graphs may be weighted higher than the similarity score for the concept phrase graphs when determining the combined overall similarity score.

As described above, determining the concept phrase and core concept phrase graphs for each document 115 may be difficult and time consuming. Moreover, determining such graphs for documents 115 that are video or audio content items may be difficult because of a lack of available metadata. Accordingly, the similarity engine 150 may further include a query engine 320. The query engine 320 may generate one or more queries 120 using the concept phrase graph and core concept phrase graph for a document 115 identified in a similarity request 155, and may provide the generated queries 120 to one or more search engines 160. The query engine 320 may then identify the similar documents 117 using search results 165 received from the one or more search engines 160 in response to the queries 120.

The query engine 320 may generate the one or more queries 120 based on the concept phrase graph and core concept phrase graph associated with a document 115. Depending on the implementation, each query 120 may be generated by combining a core concept phrase of the core concept phrase graph with one or more concept phrases from the concept phrase graph.

In one implementation, the query engine 320, for each core concept phrase, may generate queries 120 for the core concept phrase by combining the core concept phrase and each concept phrase from the concept phrase graph that is covered by the core concept phrase. Accordingly, each generated query 120 may include a core concept phrase, and a concept phrase. Similarly as described above, a concept phrase may be covered by a core concept phrase if it within a selected radius or distance of the core concept phrase in the universal concept phrase graph. The maximum or minimum number of generated queries 120 may be set by a user or administrator. Depending on the implementation, the query engine 320 may assign a weight to each generated query 120. The weight may be based on the core concept phrase associated with the query 120. For example, the greater the number of concept phrases covered by a core concept phrase associated with a query 120, the greater the assigned weight. The assigned weights may be used to rank the documents that are responsive to the generated queries.

The query engine 320 may submit the generated queries 120 to one or more search engines 160. Depending on the implementation, the query engine 320 may submit the queries 120 to search engines 160 that cover a variety of different document 115. For example, the query engine 320 may submit the queries 120 to search engines 160 that specialize in one of more of videos, images, or other types of documents 115. Alternatively or additionally, the similarity request 155 may specify the type of document 115 that is requested, and the query engine 320 may provide the generated queries 120 to a search engine 160 that specializes in that type of document 115.

The presentation engine 340 may provide one or more similar documents 117 in response to a similarity request 155. Depending on the implementation, the presentation engine 340 may provide the complete similar documents 117 in response to the similarity request 155, or may provide links or references to the similar documents 117. Alternatively, the presentation engine 340 may provide links to the similar documents 117 along with portions or summaries of the similar documents 117.

In implementations where the similarity engine 150 calculates similarity scores for the documents 115 using the concept phrase graphs and/or the core concept phrase graphs, the presentation engine 340 may determine the similar documents 117 based on the calculated similarity scores. For example, the presentation engine 340 may select the documents 115 with the top five, ten, or fifteen highest similarity scores with respect to the document 115 indicated in the similarity request 155.

Alternatively or additionally, the presentation engine 340 may determine the similar documents 117 by selecting documents 115 from one or more categories of document 115 according to the generated similarity scores. Each document 115 category may correspond to a type of document such as webpage, video, image, or audio document. By selecting a document 115 from multiple categories, the variety of the types of documents 115 that are presented to a user is increased.

In implementations where the query engine 320 generates queries 120 based on the concept phrase graph and/or the core concept phrase graph associated with a document 115 indicated by a similarity request 155, the presentation engine 340 may determine the similar documents 117 using search results 165 received from the one or more search engines 160 in response to the generated queries 120. For example, the presentation engine 340 may include indicators of highly ranked documents 115 from each of the search results 165 in the similar documents 117.

Alternatively, the presentation engine 340 may rank the documents 115 indicated in each of the search results 165 based on the number of search results 165 that the documents 115 appear in. As described above, each search results 165 may be received from a search engine 160 in response to a different query 120. Intuitively, the more queries 120 that a particular document 115 is responsive to, the more likely that the document 115 is to be similar to the document 115 indicated in the similarity request 155. The highest ranked documents 115 may then be included in the similar documents 117. Alternatively or additionally, the documents may be ranked based on weights associated with the queries that each document was responsive to, and a position of each document in the search results 165 associated with each query that the document was responsive to.

Depending on the implementation, the presentation engine 340 may provide the similar documents 117 to a client device 110 that originated the similarity request 155. Where the similarity engine 150 is part of the client device 110 (such as e-reader application or other document 115 viewer) the presentation engine 340 may cause the one or more of the similar documents 117 to be presented to a user alongside the document 115 indicated in the similarity request 155 in the display 367. For example, the presentation engine 340 may cause indicators of the similar documents 117 to be displayed in the window 220 of the tablet computer 200.

Depending on the implementation, the initial document 115 that was provided in the similarity request 155 may have corresponded to only a portion of a document 115, such as a page of the document 115. Thus, the similar documents 117 presented to the user may be similar to the portion of the document 115, rather than the document 115 as a whole. As the user leaves the portion of the document and begins to view a next portion of the document (i.e., a new page or chapter of the document 115), the client device 110 may automatically generate a new similarity request 155 upon detecting that the user is viewing the next portion. The similarity request 155 may identify or may include the next portion of the document 115. The similarity engine 150 may then provide a new set of similar documents 117 for presentation to the user. In this way, the similar documents 117 may be continuously updated and refreshed based on where the user is in the document 115 to ensure that the most relevant similar documents 117 are being presented.

Figure 4:
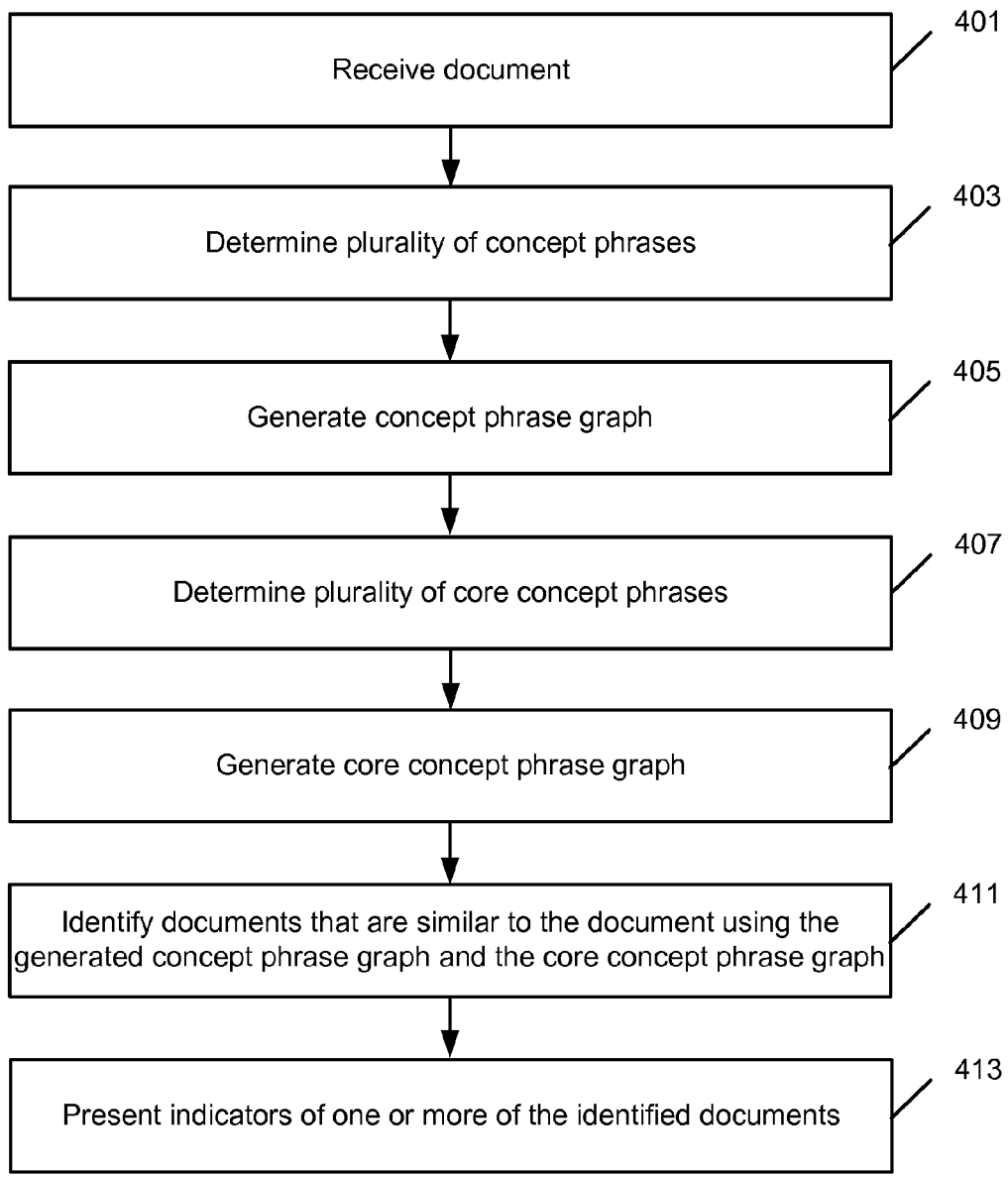
FIG. 4 is an operational flow of an implementation of a method for identifying similar documents.

FIG. 4 is an operational flow of an implementation of a method 400 for identifying similar documents. The method 400 may be implemented by the apparatus 300 and/or the similarity engine 150.

At 401, a document is received. The document 115, or an indicator of the document 115, may be received by the similarity engine 150 from a client device 110 as part of a similarity request 155. Alternately, the similarity engine 150 may be part of the client device 110, and the document 115 may be received from an application that is used to view the document 115 such as an e-reader. The received document 115 may be an e-book, or a section of an e-book such as a chapter or a page of an e-book. Other types of documents 115 may be supported The similarity request 155 may be a request to identify documents that are similar to the received document 115. The documents may include webpages, other e-books, video documents, audio documents, and image documents, for example. Any type of document may be supported.

At 403, a plurality of concept phrases is determined. The concept phrases may be from the document 115, and may be determined by the concept phrase engine 310 by parsing text and/or metadata of the document 115. The concept phrases may include words or phrases. In some implementations, the concept phrase engine 310 may determine the concept phrases by extracting k-grams from the document 115 (or the metadata associated with the document 115) and matching the extracted k-grams against external data 145 such as headings of an online encyclopedia, or against concept phrases that are associated with a universal concept phrase graph, for example. Any method or technique for determining concept phrases may be used.

At 405, a concept phrase graph is generated. The concept phrase graph may be generated by the concept phrase engine 310. In some implementations, the concept phrase graph may be a sub-graph of the universal concept phrase graph and may be generated using the nodes and edges of the universal concept phrase graph that correspond to the determined plurality of concept phrases.

At 407, a plurality of core concept phrases is determined. The core concept phrases may be determined by the concept phrase engine 310 from the concept phrases and the universal concept phrase graph. For example, the core concept phrases may be determined iteratively by, at each iteration, selecting a concept phrase from the universal concept phrase graph that covers the greatest number of the plurality of concept phrases that have not already been covered by a selected concept phrase. The selected concept phrases are the core concept phrases. In some implementations, the concept phrase engine 310 may determine the number of concept phrases that a particular concept phrase of the universal concept phrase graph covers by traveling a predetermined distance or radius from the node associated with the particular concept phrase in the universal concept phrase graph. Any concept phrases associated with nodes that are reachable from the particular concept phrase at the predetermined distance or radius are covered by the particular concept phrase.

At 409, a core concept phrase graph is generated. The core concept phrase graph may be generated by the concept phrase engine 310 similarly as described above for the concept phrase graph.

At 411, documents that are similar to the received document are identified using the generated concept phrase graph and the generated core concept phrase graph. In one implementation, the similar documents 117 may be identified using the using the generated concept phrase graph and the generated core concept phrase graph, along with concept phrase graphs and the core concept phrase graphs associated with a plurality of documents 115. Each document of the plurality of documents 115 may be assigned a similarity score based on the similarity of the concept phrase and core concept phrase graphs associated with the document and the concept phrase and core concept phrase graphs associated with the received document. The similarity score may be weighted to favor the core concept phrase graphs, for example. The documents of the plurality of documents 115 having the highest similarity scores may be identified as the similar documents 117. Any method for calculating the similarity of graphs may be used.

In other implementations, the query engine 320 of the similarity engine 150 may use the concept phrase and core concept phrase graphs associated with the received document to generate a plurality of queries 120. The generated queries 120 may be submitted to one or more search engines 160, and the search engines 160 may respond with one or more search results 165 that identify documents that are responsive to the queries 120. The documents that are identified in the most search results 165 may be identified as the similar documents 117.

At 413, indicators of one or more of the identified documents are presented. The identified documents may be the similar documents 117 and the indicators may be presented by the presentation engine 340. The indicators may be presented to a user while the user is viewing the received document. For example, links or summaries of the identified documents 117 may be displayed to a user in a region of an e-reader, smart phone, or tablet computer reserved for similar documents. As the reader reads the document, the reader may select one of the similar documents to view content associated with the selected similar document. Depending on the implementation, as the user reads the document 115, the particular similar documents 117 that are presented may be updated or changed based on the particular page, section, or chapter of the document 115 that the user is currently reading.

Figure 5:
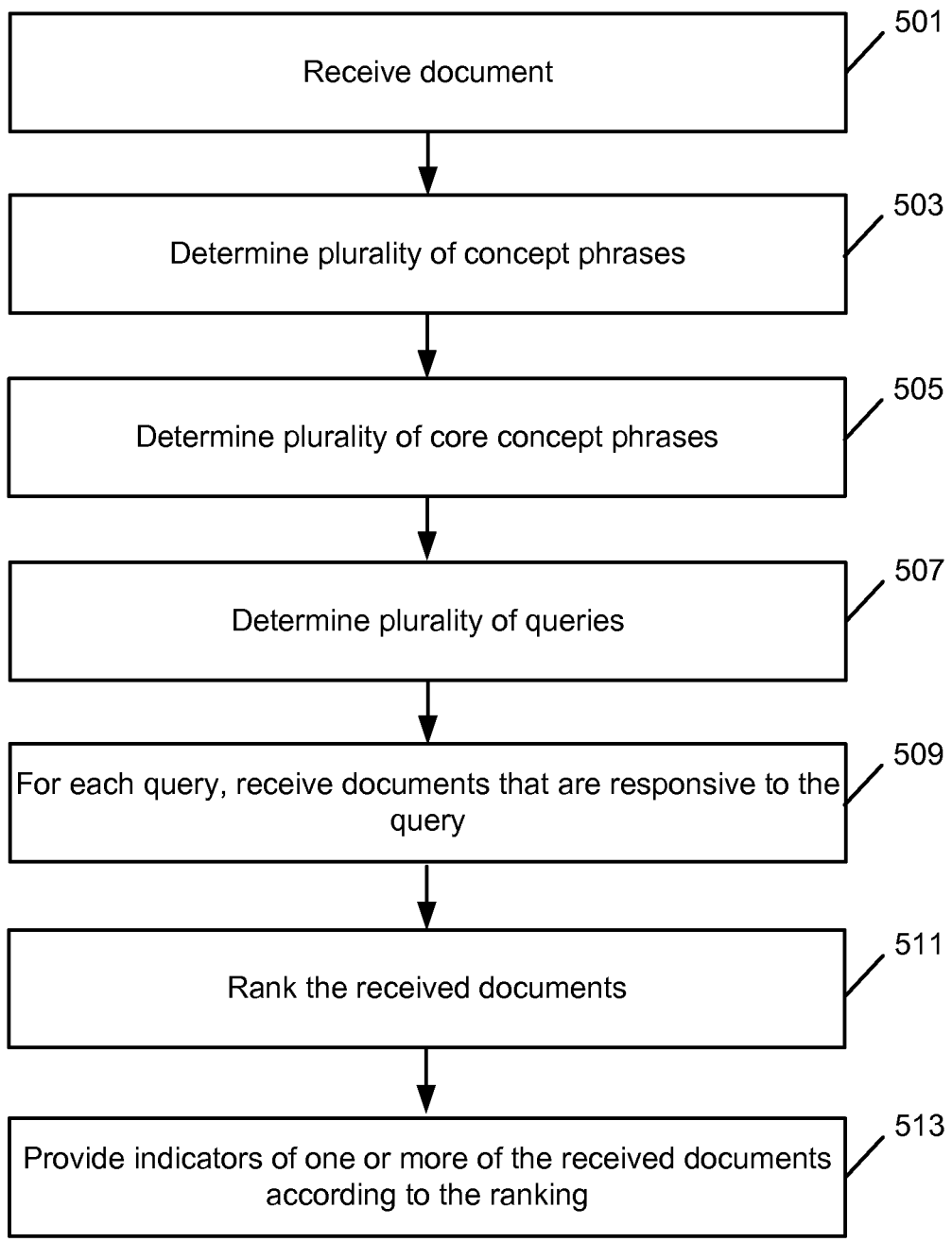
FIG. 5 is an operational flow of an implementation of a method for providing indicators of similar documents.

FIG. 5 is an operational flow of an implementation of a method 500 for providing indicators of similar documents. The method 500 may be implemented by the apparatus 300 and/or the similarity engine 150.

At 501, a document is received. The document 115, or an indicator of the document 115, may be received by the similarity engine 150 from a client device 110 as part of a similarity request 155. The similarity request 155 may be a request to identify documents that are similar to the received document 115.

At 503, a plurality of concept phrases is determined. The concept phrases may be from the document 115, and may be determined by the concept phrase engine 310 by parsing text and/or metadata of the document 115. The concept phrases may include words or phrases. Any method or technique for determining concept phrases may be used. Depending on the implementation, the plurality of content phrases may also be used to generate a concept phrase graph which is a sub-graph of a universal concept phrase graph. The concept phrase graph may include a node for each concept phrase and edges between nodes that represents that the concept phrases associated with the connected nodes are related.

At 505, a plurality of core concept phrases is determined. The core concept phrases may be determined by the concept phrase engine 310 from the concept phrases. The core concept phrases may represent the focus of the associated document 115. Depending on the implementation, the core concept phrases may be used to generate a core concept phrase graph which is a sub-graph of a universal concept phrase graph. The core concept phrase graph may be similar to the concept phrase graph described above.

At 507, for each core concept phrase, a plurality of queries is determined. The plurality of queries may be determined by the query engine 320. Each of the generated queries 120 may be sent to one or more search engines 160. In some implementations, each query 120 of the plurality of queries for a core concept phrase may be generated by combining the core concept phrase with a different selected one of the plurality of concept phrases. The total number of queries 120 generated for each core concept phrase may be set by a user or an administrator, or may be equal to the total number of concept phrases.

In implementations using concept phrase graphs, the each query for a core concept phrase may be generated by first determining the concept phrases that are within a predetermined distance or radius of the core concept phrase in the universal concept phrase graph. Each query 120 may then be generated by combining the core concept phrase with a different one of the concept phrases that are within the predetermined distance.

At 509, for each query, indicators of documents that are responsive to the query are received. The indicators may be received by the query engine 320. The indicators may be received as search results 165 in response to each of the determined queries 120.

At 511, the indicated documents are ranked. The indicated documents may be ranked based by the query engine 320 based on the number of search results 165 that each document is indicated in. The indicated documents may also be ranked based on other information including weights associated with the queries that each indicated document was responsive to, and a position of each indicated document in the search results associated with each query that the indicated document was responsive to.

At 513, one or more of the indicators of the documents are presented according to the ranking. The indicators of the documents may be presented by the presentation engine 340 along with the document that was indicated in the received similarity request 155.

Figure 6:
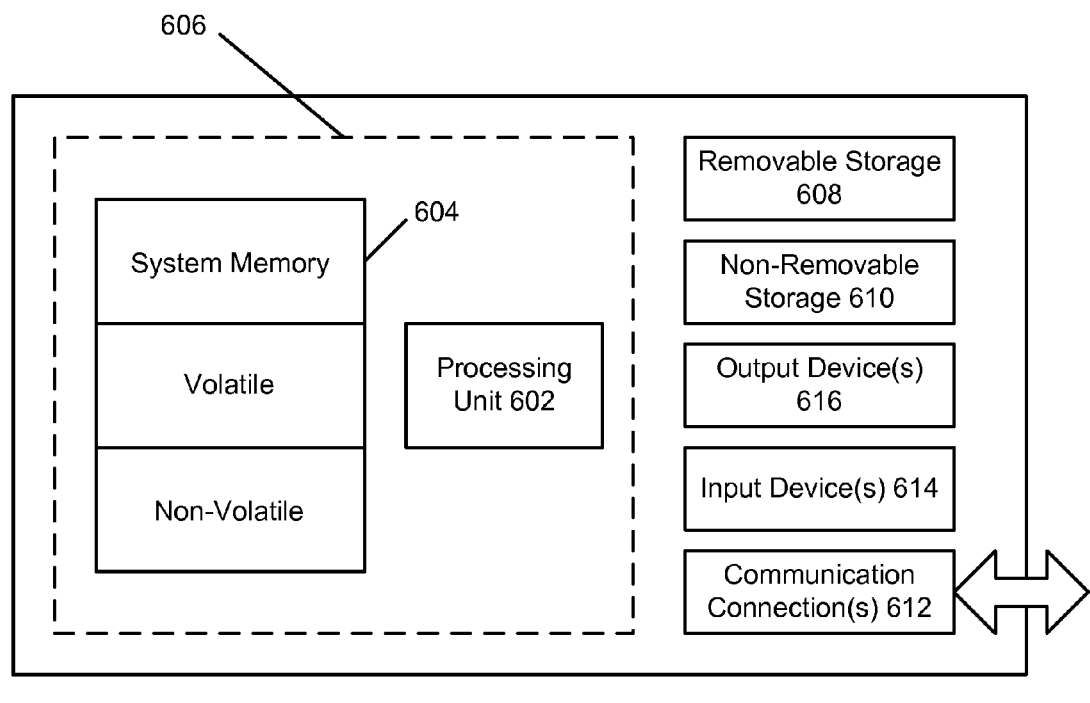
FIG. 6 shows an exemplary computing environment in which example embodiments and aspects may be implemented.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    determining a universal concept phrase graph that comprises a plurality of nodes and a plurality of edges, wherein each node corresponds to a concept phrase of a first plurality of concept phrases, and wherein each edge is between a pair of nodes of the plurality of nodes and each edge represents a relationship between the concept phrases corresponding to the pair of nodes;
    receiving a document by a computing device;
    determining a second plurality of concept phrases associated with the document by the computing device, wherein the second plurality of concept phrases is a subset of the first plurality of concept phrases;
generating a concept phrase graph of the received document based on the determined second plurality of concept phrases and the universal concept phrase graph by the computing device, wherein the concept phrase graph comprises a subset of nodes of the plurality of nodes from the universal concept phrase graph that correspond to the concept phrases of the second plurality of concept phrases, and further comprises edges from the universal concept phrase graph that are between pairs of nodes from the subset of nodes; and
identifying one or more documents of a plurality of documents that are similar to the received document based on the concept phrase graph of the received document, and concept phrase graphs associated with each of the documents of the plurality of documents by the computing device.

2. The method of claim 1, further comprising presenting indicators of one or more of the identified one or more documents of the plurality of documents that are similar to the received document.

3. The method of claim 2, wherein the indicators are presented while the received document is being viewed.

4. The method of claim 1, wherein the computing device is one or more of an e-reader, a smart phone, or a tablet computer.

5. The method of claim 1, further comprising:
determining a plurality of core concept phrases associated with the received document based on the plurality of concept phrases associated with the received document;
generating a core concept phrase graph for the received document based on the determined plurality of core concept phrases; and
wherein identifying the one or more documents of the plurality of documents that are similar to the received document further comprises identifying the one or more documents of a plurality of documents that are similar to the received document based on the concept phrase graph of the received document, the core concept phrase graph of the received document, and the concept phrase graphs and core concept phrase graphs associated with each of the documents of the plurality of documents.

6. The method of claim 1, wherein the received document comprises an e-book, a chapter of an e-book, or a section of an e-book.

7. The method of claim 1, wherein the plurality of documents comprise one or more of video documents, image documents, and webpages.

8. A method comprising:
determining a universal concept phrase graph that comprises a plurality of nodes and a plurality of edges, wherein each node corresponds to a concept phrase of a first plurality of concept phrases, and wherein each edge is between a pair of nodes of the plurality of nodes and each edge represents a relationship between the concept phrases corresponding to the pair of nodes;
receiving a document by a computing device;
determining a second plurality of concept phrases associated with the received document by the computing device, wherein the second plurality of concept phrases is a subset of the first plurality of concept phrases, and further wherein each concept phrase of the second plurality of concept phrases corresponds to a node of the universal concept phrase graph;
generating a concept phrase graph of the received document based on the determined second plurality of concept phrases and the universal concept phrase graph by the computing device, wherein the concept phrase graph comprises a subset of nodes of the plurality of nodes from the universal concept phrase graph that correspond to the concept phrases of the second plurality of concept phrases, and further comprises edges from the universal concept phrase graph that are between pairs of nodes from the subset of nodes;
determining a plurality of core concept phrases associated with the received document by the computing device;
generating a plurality of queries for the received document by the computing device based on the concept phrase graph and the universal concept phrase graph, wherein each query comprises a core concept phrase of the plurality of core concept phrases and at least one concept phrase of the second plurality of concept phrases;
for each query, receiving indicators of documents that are responsive to the query by the computing device; and
providing one or more of the received indicators of documents by the computing device.

9. The method of claim 8, further comprising ranking each indicated document based on one or more of a number of queries of the plurality of queries that the indicated document was responsive to, weights associated with the queries that the indicated document was responsive to, and a position of the indicated document in search results associated with each query that the indicated document was responsive to, and providing the one or more of the received indicators according to the ranking.

10. The method of claim 8, wherein the received document comprises an e-book, a chapter of an e-book, or a section of an e-book.

11. The method of claim 8, wherein the indicated documents comprise one or more of video documents, image documents, and webpages.

12. The method of claim 8, wherein the computing device is one or more of an e-reader, a smart phone, or a tablet computer.

13. The method of claim 8, wherein each core concept phrase corresponds to a node of the universal concept phrase graph, and generating the plurality of queries for the received document based on the concept phrase graph and the universal concept phrase graph comprises:
for each core concept phrase:
determining one or more concept phrases of the second plurality of concept phrases that correspond to nodes of the concept phrase graph that are within a pre-determined distance of the node of the universal concept phrase graph that corresponds to the core concept phrase; and
generating a query comprising the core concept phrase and the determined one or more concept phrases of the second plurality of concept phrases.

14. An apparatus comprising:
a processor;
a concept phrase engine adapted to:
determine a universal concept phrase graph that comprises a plurality of nodes and a plurality of edges, wherein each node of the universal concept phrase graph corresponds to a concept phrase of a first plurality of concept phrases, and wherein each edge is between a pair of nodes of the plurality of nodes and each edge represents a relationship between the concept phrases corresponding to the pair of nodes;

determine a second plurality of concept phrases associated with a document being viewed on a display of the computing device, wherein the second plurality of concept phrases is a subset of the first plurality of concept phrases, and wherein each concept phrase of the second plurality of concept phrases corresponds to a node of the universal concept graph;

determine a plurality of core concept phrases associated with the document, wherein each core concept phrase corresponds to a node of the plurality of nodes of the universal concept graph; and generate a concept phrase graph of the document based on the determined second plurality of concept phrases and the universal concept phrase graph, wherein the concept phrase graph comprises a subset of nodes of the plurality of nodes from the universal concept phrase graph that correspond to the concept phrases of the second plurality of concept phrases, and further comprises edges from the universal concept phrase graph that are between pairs of nodes from the subset of nodes; and a query engine adapted to:

for each core concept phrase:

determine one or more concept phrases of the second plurality of concept phrases that correspond to nodes of the concept phrase graph that are within a pre-determined distance of the node of the universal concept phrase graph that corresponds to the core concept phrase; and generate a query comprising the core concept phrase and the determined one or more concept phrases of the second plurality of concept phrases; and for each generated query, determine documents of a plurality of documents that are responsive to the query.

15. The apparatus of claim 14, further comprising:

a display; and a presentation engine adapted to:

rank each determined document based on one or more of a number of queries that the determined document was responsive to, weights associated with the queries that the determined document was responsive to, and a position of the determined document in search results associated with each query that the determined document was responsive to; and present at least a portion of the determined documents according to the ranking on the display while the document is being viewed on the display.

16. The apparatus of claim 14, wherein the document being viewed on the display comprises an e-book, a chapter of an e-book, or a section of an e-book.

17. The apparatus of claim 14, wherein the plurality of documents comprise one or more of video documents, image documents, and webpages.

18. The apparatus of claim 14, wherein the apparatus is one or more of an e-reader, a smart phone, or a tablet computer.

* * * * *